United States Patent [19]

Shu et al.

[11] Patent Number: 4,926,267
[45] Date of Patent: May 15, 1990

[54] REPRODUCTION OF HALFTONE ORIGINAL WITH REDUCED MOIRE

[75] Inventors: Joseph S. Shu, White Plains, N.Y.; Robert Springer, Wyckoff, N.J.; Chia L. Yeh, Saratoga, Calif.

[73] Assignee: Nynex Corporation, New York, N.Y.

[21] Appl. No.: 358,061

[22] Filed: May 26, 1989

[51] Int. Cl.⁵ .............................................. H04N 1/40
[52] U.S. Cl. .................................. 358/454; 358/456; 358/298
[58] Field of Search .................... 358/484, 456, 298

[56] References Cited

U.S. PATENT DOCUMENTS

| | | | |
|---|---|---|---|
| 4,051,536 | 9/1977 | Roetling | 358/298 |
| 4,196,452 | 4/1980 | Warren et al. | 358/456 |
| 4,210,936 | 7/1980 | Cinque et al. | 358/456 |
| 4,259,694 | 3/1981 | Liao | 358/456 |
| 4,336,558 | 6/1982 | Lew | 358/454 |
| 4,516,175 | 5/1985 | Jung et al. | 358/454 |
| 4,538,184 | 8/1985 | Otsuka et al. | 358/456 |
| 4,556,918 | 12/1985 | Yamazaki et al. | 358/456 |
| 4,616,266 | 10/1986 | Hennig | 358/454 |
| 4,638,369 | 1/1987 | Hsieh | 358/456 |
| 4,651,287 | 3/1987 | Tsao | 364/519 |
| 4,654,721 | 3/1987 | Goertzel et al. | 358/456 |
| 4,670,792 | 6/1987 | Dureigne | 358/484 |
| 4,786,975 | 11/1988 | Postl | 358/454 |

Primary Examiner—Edward L. Coles, Sr.
Attorney, Agent, or Firm—Douglas Kirk; John J. Torrente

[57] ABSTRACT

A method and system for reproducing halftone originals utilizing threshold gray level values of the scanned pixels of the halftone original to determine adjacent pairs of pixels bordering the edges of the halftone dots. Edge errors for the adjacent pairs of pixels are determined using the scanned gray level values and a threshold value. A processing window defines sub-arrays of pixels whose thresholded gray level values are processed based on the edge errors. For each sub-array, the edge errors of the adjacent pairs of pixels are summed. The thresholded values of the adjacent pairs of pixels are then selectively changed in the order of pixel pairs of descending edge error until the number of values changed equals the closest integer to the summed edge error.

38 Claims, 2 Drawing Sheets

REPRODUCTION OF HALFTONE ORIGINAL WITH REDUCED MOIRE

BACKGROUND OF THE INVENTION

This invention relates to halftone artwork and, in particular, to a method and apparatus for reproducing such artwork.

Halftone artwork is used in many applications. This type of artwork employs halftone dots (i.e., darkened or black dots) to provide an image. In particular, by changing the size of the dots, different gray levels can be produced so as to simulate the grey levels of the image. The halftone dots are typically situated along a screen direction and the dot spatial frequency and period in the screen direction, called the "screen frequency" $f_{SCR}$ and "screen period" $P_{SCR}$, are kept constant.

In some applications, it is desirable to be able to reproduce halftone artwork. In present day reproduction systems, a scanner typically scans the elemental areas (i.e., "pixels") of the original halftone artwork in orthogonal first and second directions. The scanner operates in these directions at corresponding first and second spatial scanning frequencies $f_{SCA1}$, $f_{SCA2}$ having associated periods $P_{SCA1}$, $P_{SCA2}$. These frequencies and, thus, their resultant periods, are usually equal.

As a result of this scanning, digital signals are developed corresponding to the gray level values of the orthogonal array of pixels. These digital signals are then thresholded at a threshold gray level value which typically might be at the mid-point of the gray tone range which extends from 255 (black) to 0 (white). This thresholding provides a corresponding set of thresholded or binary gray level values.

More particularly, each digital signal representing a gray level equal to or above the threshold gray level value, e.g., above 128, results in a corresponding binary signal indicative of a first gray level value, typically a 255 (black) gray level value. Each digital signal representing a gray level value less than the 128 threshold, in turn, results in a corresponding binary signal indicative of a second gray level value, typically a 0 (white) gray level value. The resultant set of binary signals are then used to control a printer. The latter generates reproduction pixels corresponding to the signals and, therefore, to the scanned array of pixels of the original halftone. The printer prints in the orthogonal first and second directions at respective spatial print frequencies $f_{PRI1}$, $f_{PRI2}$ having corresponding print periods $P_{PRI1}$, $P_{PRI2}$. Again, these frequencies and thus their respective periods are usually equal.

More specifically, the printer darkens each reproduction pixel whose corresponding binary signal is indicative of a 255 (black) gray level value and leaves blank or undarkened each reproduction pixel whose corresponding binary signal is indicative of a 0 (white) gray level value. These black and white reproduction pixels then combine to produce the reproduction of the halftone original.

While the above method results in reproducing the halftone original with some degree of success, it has been found to generate so called "Moiré patterns" in the reproduction. These patterns represent beat patterns of the screen and scan frequencies and are undesirable in most applications.

Accordingly, research efforts have been underway to develop practices for reproducing halftone originals which generate little or no Moiré patterns in the reproduction. Copending patent application Ser. No. 241,073, assigned to the same assignee hereof, discloses one such reproduction method. In the case of the method of '073 application, the scanning frequency of the system scanner is selected to have a preselected relationship with respect to the screen frequency of the original. Additionally, an adaptive threshold processing technique is utilized in developing the thresholded binary gray level signals from the gray level digital signals of the scanned pixels.

This processing makes use of a scanning window which enables processing of sub-arrays of the pixel digital signals. The size of the scanning window is appropriately selected to be equal to the screen period translated to the scanning direction. Moreover, the processing is such that the average gray levels of the resultant binary signals associated with a given sub-array of pixels is equal to the average gray level of the corresponding digital signals over the sub-array.

The method of the '073 application has been found to provide a significant reduction in the Moiré patterns evidenced in the reproduction. However, efforts are still underway to develop other alternative methods which can also provide reproduction of halftone originals with reduced Moiré.

It is, therefore, an object of the present invention to provide a method and apparatus for reproducing halftone originals having a reduced amount of Moiré patterns.

SUMMARY OF THE INVENTION

In accordance with the principles of the present invention, the above and other objectives are realized in a practice in which the thresholded gray level values of the array of scanned pixels are utilized to determine in the first direction of the array, pairs of adjacent pixels whose thresholded gray level values differ. For each determined pair of adjacent pixels, an approximate edge error to the closest edge of the adjacent halftone dot is determined. Specifically, the edge error is determined by the expression $d_1/P_{SCA1}$, where $d_1$ is the distance along the first direction between the center of the pixel of the pair whose thresholded gray level value is the first gray level value and the aforesaid closest edge of the adjacent halftone dot.

These edge errors are then utilized in the further processing of the thresholded gray level values of the array. This further processing is via a two dimensional processing window which defines sub-arrays of pixels whose thresholded gray level values are to be processed. For each sub-array, such processing comprises adding the edge errors of the determined adjacent pairs of pixels included in the sub-array to form a sum $S_1$. Then, starting with the pairs of pixels having the highest edge error and continuing with pairs in descending order of edge error, the pixel of each pair having the second thresholded gray value has the latter changed to the first thresholded value. This continues for M pixels, where M is the closest integer to the sum $S_1$.

Once the aforesaid processing is complete for all sub-arrays, the resultant thresholded gray level value signals are then used in usual manner to address a printer which darkens reproduction pixels corresponding to the first thresholded gray level values and leaves blank reproduction pixels corresponding to the second thresholded gray level values. The resultant reproduction is found to provide a good approximation of the halftone original with little or no Moiré in the first direction.

In the embodiment of the invention to be disclosed hereinafter, the method of the invention is extended to reduce Moiré patterns in the second direction by repeating the method in that direction. Thus, further adjacent pairs of pixels in the second direction are determined, edge errors are developed for the further adjacent pairs of pixels and a window is used to process the thresholded gray level values of sub-arrays of pixels using the further pairs of pixels and edge errors following the processing procedure followed for the first direction.

Once this additional second direction processing is completed, the resultant thresholded gray level values are then utilized to form the reproduction. With this additional processing Moiré is substantially eliminated in both the first and second directions of the reproduction.

Also disclosed are expressions for calculated the approximate edge error for the pairs of pixels.

BRIEF DESCRIPTION OF THE DRAWINGS

The above and other features and aspects of the present invention will become more apparent upon reading the following detailed description in conjunction with the accompanying drawings, in which.

Detailed Description

Figure 1:
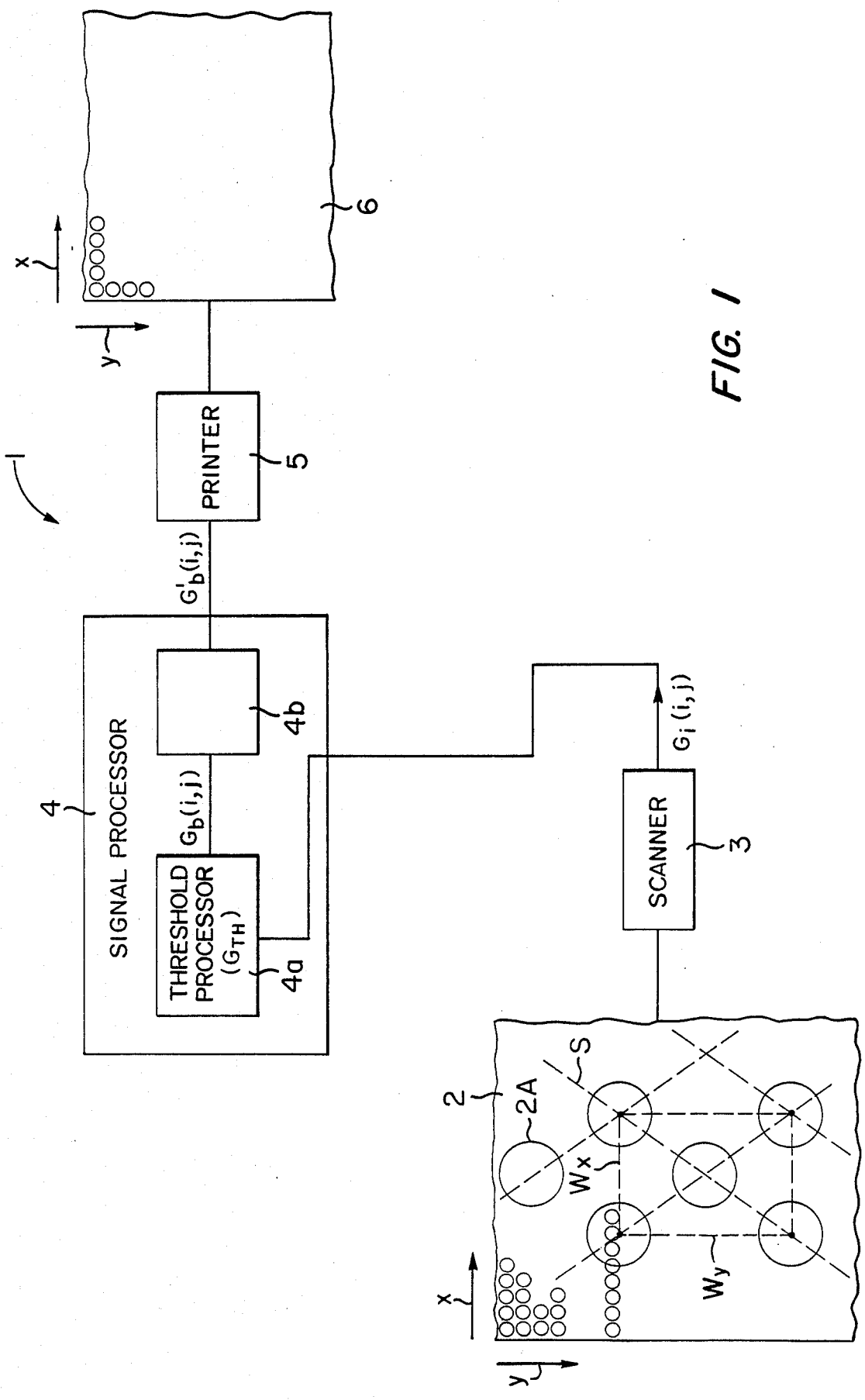
FIG. 1 shows a reproduction system designed in accordance with the principles of the present invention.

FIG. 1 shows a reproduction system in accordance with the principles of the present invention. The system 1 is to reproduce a halftone original 2 having extent in the x and y directions and whose image is formed by halftone dots 2A. The dots 2A are aligned along a screen direction S which, in the present case, it at a 45° angle to the x,y directions. Moreover, the dots 2A have a spatial frequency $f_{SCR}$ and a corresponding period $P_{SCR}$ in the direction S.

A scanner 3 scans elemental areas or pixels p of the original 2 in the orthogonal x and y directions at spatial scanning frequencies $f_{SCAx}$, $f_{SCAy}$ having associated periods (i.e., pixel center-to-center spacings) $P_{SCAx}$, $P_{SCAy}$. In the present illustrate case, the frequencies $f_{SCAx}$ and $f_{SCAy}$ are assumed to be equal and can be represented by the frequency $f_{SCA}$. The periods $P_{SCAx}$ and $P_{SCAy}$ are thus also equal and given by $P_{SCA}$.

The scanned pixels p represent an array of pixels in the x and y direction. Accordingly, the elements of the pixel array can be represented by p(i,j), where i and j are integers which identify the pixel positions in the array. The corresponding x and y positions of the pixels are given by $$x = i \cdot P_{SCA} \quad (1)$$

$$y = j \cdot P_{SCA} \quad (2)$$

As a result of the scanning by the scanner 3, a signal $G_I(i,j)$ is developed for each pixel p(i,j) corresponding to the gray level value of the pixel. The signals $G_I(i,j)$ may typically be 8 bit digital signals to accommodate gray levels over the entire gray level range of 0 (white) to 255 (black).

The digital gray level signals $G_I(i,j)$ are then introduced into a signal processor 4 where they first undergo threshold processing in a threshold processor 4a. The latter processor develops binary gray level signals $G_b(i,j)$ in response to the digital input signals $G_I(i,j)$. Each signal $G_b(i,j)$ is thus a 1 bit signal and corresponds to an associated pixel p(i,j).

More particularly, for each input signal $G_I(i,j)$ indicative of gray level equal to above the threshold $G_{TH}$, the threshold processor $4_a$ generates a first digital signal (e.g., a "1" level signal) indicative of a first gray level value. For each input signal $G_I(i,j)$ which is below the threshold, the processor $4a$ generates a second digital signal (e.g., a "0" level signal) indicative of a second gray level value. In the present illustrative case, the threshold value $G_{TH}$ is assumed to be at the gray level value of 128 and the first and second gray level values at 255 (black) and 0 (white), respectively.

The binary signals $G_b(i,j)$ are further processed in a Moiré reduction processor 4b to develop a processed set of binary signals $G_b'(i, j)$. As can be appreciated and as will be more fully discussed below, the processing by the processor 4b causes modification of the signals $G_b(i,j)$ which are associated with pixels p(i,j) bordering the halftone dots 2A. This results in the modified digital signals $G_b'(i, j)$ which when used to generate the reproduction 6 result in little or no Moiré patterns being evidenced in the reproduction.

The processed signals $G'_b(i,j)$ are fed to a printer 5 which addresses the reproduction 6 at reproduction pixels r(i,j) along the x and y directions. The printer 5 operates in these directions at spatial frequencies $f_{PRIx}$, $f_{PRIy}$ having associated spatial periods $P_{PRIx}$, $P_{PRIy}$. In the present case, the frequencies $f_{PRIx}$ and $f_{PRIy}$ are assumed to be equal and are given as $f_{PRI}$. The periods $P_{PRIx}$ and $P_{PRIy}$ are, therefore, also equal and given as $P_{PRI}$.

At each of the reproduction pixels r(i,j), the printer 5 either darkens the pixel area or leaves in undarkened, depending upon the gray level value of associated binary signal $G'_b(i,j)$. For signals $G'_b(i,j)$ which are at a "1" level indicative of a 255 (black) gray level, the reproduction pixels r(i,j) are darkened. For signals $G_b'(i,j)$ which are at a "0" level indicative of a 0 (white) gray level, on the other hand, the reproduction pixels r(i,j) are left blank.

Accordingly, the printing operation of the printer 5 results in an array of darkened and undarkened areas at the reproduction pixels r(i,j) which correspond to the pixels p(i,j) of the original. These reproduction pixels, in turn, combine to approximate the halftone dots of the original and, therefore, to create the desired halftone reproduction 6. As indicated above, as a result of the processing which occurs in the processor 4b, the reproduction 6 developed from the binary signals $G'_b(i,j)$ is found to be substantially free of Moiré patterns.

Turning now to the operation of the the processor 4b, the processor is configured to process the binary signals $G_b(i,j)$ first in one of the x,y directions and then, if desired, in the other of these directions. In the present illustration case, x direction processing is first carried out.

Figure 2:
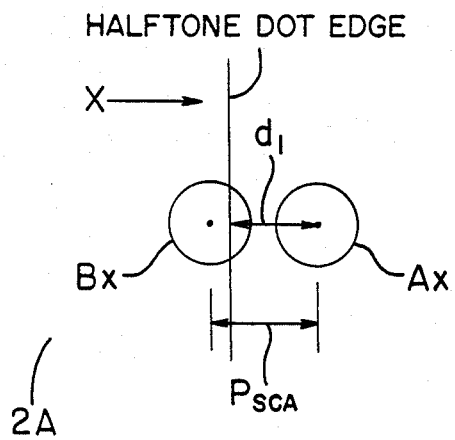
FIGS. 2 and 3 show pairs of pixels of a halftone original being reproduced by the system of FIG. 1.

More particularly, in processing the $G_b(i,j)$ signals in the x direction, the processor 4b initially determines from the array of signals, each adjacent pair of pixels $A_x$, $B_x$ in the x direction whose corresponding signals $G_b(i,j)$ differ. These pixel pairs occur at the edges of the halftone dots 2A as illustrated in FIG. 2. In the present case, the $A_x$ pixel is the pixel in a pair whose corresponding $G_b(i,j)$ value is a "1" indicative of a 255 gray level, while the $B_x$ pixel is the pixel in a pair whose corresponding $G_b(i,j)$ value is a "0" indicative of a 0 gray level.

As the illustration in FIG. 2 shows, the size of the halftone dot 2A is considerably larger than that of the pixels $p(i,j)$ so that when a pixel is centered on the edge of the halftone, the scanner 3 registers a gray level value $G_i(i,j)$ of about 128. Pixels whose centers are off the edge toward halftone dot center, in turn, result in gray levels $G_i(i,j)$ greater than 128, while pixels whose centers are off the edge away from the halftone dot center register gray level signals $G_i(i,j)$ of less than 128. In FIG. 2, the leftmost pixel thus has a gray level value less than 128 and a corresponding $G_b(i,j)$ signal whose value is "0". It is therefore a $B_x$ pixel. Its adjacent pixel, in turn, has a corresponding $G_b(i,j)$ signal whose value is "1" and, hence, is an $A_x$ pixel. In the next pair of x adjacent pixels shown in FIG. 3, the leftmost pixel has a $G_b(i,j)$ signal whose value is "1" and it is, therefore, an $A_x$ pixel, while its adjacent pixel has a $G_b(i,j)$ value of "0" and is a $B_x$ pixel.

Once the pairs of pixels $A_x$, $B_x$ have been determined, the processor 4b then determines an edge error $e_1$ for each pair. The edge error $e_1$ is the relative distance of the $A_x$ pixel in each pair from the closest edge of the corresponding halftone dot. Thus, $e_1$ is given as $$e_1 = d_1/P_{SCA} \quad (1)$$

The value $d_1$, in turn, can be estimated based on the scanned gray level values $G_i(i,j)$ of the $A_x$ and $B_x$ pixels and on the threshold value $G_{TH}$ as follows:

$$d_1 = P_{SCA} \cdot [1 - (G_{TH} - G_B)/(G_A - G_B)] \quad (2)$$

The relative error $e_1$, therefor, becomes $$e_1 = 1 - (G_{TH} - G_B)/(G_A - G_B) \quad (3)$$

which for the present case of $G_{TH}$ equal to 128 is $$e_1 = 1 - (128 - G_B)/(G_A - G_B) \quad (4)$$

Having determined the edge errors $e_1$ for the x direction pixel pairs $A_x$, $B_x$, the processor 4b then processes the binary signals $G_b(i,j)$ based on these values. This processing is accomplished utilizing a processing window W to define sub-arrays of pixels whose corresponding $G_b(i,j)$ signals are to be processed.

The processing window W is shown in FIG. 1 and is selected to have x and y dimensions $W_x$, $W_y$. These dimensions are based on the halftone dot spacing or period $P_{SCR}$ and are equal to the latter translated to the respective x and y directions. In the present case, since the screen direction S is at 45° to the x,y directions, $W_x$ and $W_y$ are the same and equal to $\sqrt{2} P_{SCR}$. With the dimensions of the processing window W so selected, the window will encompasses at least the equiavlent of two halftone dots as can be seen in FIG. 1.

Once the processing window is positioned by the processor 4b to define a given sub-array of pixels, the processor then adds the edge errors $e_1$ of each pair of adjacent pixels $A_x$, $B_x$ included in the sub-array to develop a sum $S_1$. The processor 4b then proceeds to process the digital signals $G_b(i,j)$ associated with these pixel pairs. It does so by starting with the digital signal $G_b(i,j)$ of the pixel pair $A_x$, $B_x$ with highest edge error and then continues with the digital signals $G_b(i,j)$ of pixel pairs $A_x$, $B_x$ in the order of pairs having descending or decreasing edge error. Specifically, the processor processes the binary signals $G_b(i,j)$ of of each pair of pixels $A_x$, $B_x$ by changing the $G_b(i,j)$ signal of the $A_x$ pixel from a "0" to a "1" value so that the pixel becomes indicative of a 255 (black) gray level instead of a 0 (white) gray level.

The processor 4b continues the aforesaid processing until the binary signals $G_b(i,j)$ of M pixels have been changed where M is the closest integer to the sum $S_1$. At this time, the processing of the sub-array in the window W is complete and the processor 4b then moves the window W by the width of the window to encompass further sub-arrays of pixels. At these sub-arrays, the digital signals $G_b(i,j)$ of the $A_x$, $B_x$ pairs of pixels in the sub-array are processed similarly as in the first array. This continues until the entire array of pixels $p(i,j)$ have been processed.

Figure 3:
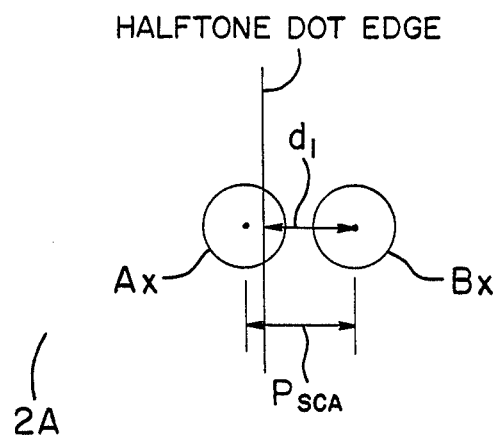

The resultant processed signals from the aforesaid processing represent the binary signals $G_b'(i,j)$, if only x direction processing is to be carried out. However, as indicated above, it is preferable to follow the aforesaid x direction processing with y direction processing of the $G_b(i,j)$ signals, after the signals have been changed or modified by the x direction processing. The y direction processing is exactly the same as the x direction processing, except that, in this case, pairs of adjacent pixels $A_y$, $B_y$ in the y direction, as shown in FIGS. 2 and 3 having different digital signals $G_b(i,j)$ are determined and processed exactly as was done for the $A_x$, $B_x$ pixel pairs.

When the x direction processing is followed by the aforesaid y direction processing, the result of this combined processing is the binary signals $G_b'(i,j)$. These signals, as above-described, cause the printer 5 to print the reproduction 6 in such a way that the reproduction evidences little or no Moiré patterns in the x and y directions.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method for use in reproducing a halftone original having extent along first and second directions, the original being formed from halftone dots situated along a screen direction and having a spatial frequency $f_{SCR}$ and period $P_{SCR}$ in the screen direction comprising:

providing gray level values for an array of pixels extending over the original, the pixels having a first spatial frequency $f_{SCA1}$ in said first direction and a corresponding first period $P_{SCA1}$ in said first direction;

developing a first gray level value for each pixel of the array whose gray level value equals or exceeds a threshold gray level value and developing a second gray level value for each pixel of the array whose gray level value is less than the threshold gray level value, said first and second gray level values defining a set of thresholded gray level values for said pixels;

determining from said set of thresholded gray level values adjacent pairs of pixels of the array in the first direction whose thresholded gray level values are different, each adjacent pair of pixels bordering a corresponding halftone dot;

determining from the gray level values of the pixels an edge error $e_1$ equal to $d_1/P_{SCA1}$, where $d_1$ is the approximate distance along the first direction between the center of the pixel of the pair whose thresholded value is equal to said first gray level value and the closest edge of the corresponding halftone dot;

and processing said thresholded gray level values of said pixels of said array including: (a) using a processing window to define successive sub-arrays of said pixels and for each sub-array of pixels: (i) adding the edge errors $e_1$ for the determined adjacent pairs of pixels included in the sub-array to form a sum $S_1$; and (ii) for the pixels having thresholded second gray level values and being in the determined adjacent pairs of pixels, starting with the pixel of the adjacent pair of pixels having the highest edge error and continuing with further pixels of the adjacent pairs of pixels in the order of descending edge error, changing the thresholded gray level values of the pixels from said second to said first threshold gray level value until the thresholded gray level values of M pixels have been changed, where M is the closest integer to the sum $S_1$.

2. A method in accordance with claim 1 wherein:
said threshold gray level value is 128;
said first gray level value is equal to greater than 128; and
said second gray level value is less than 128.

3. A method in accordance with claim 2 wherein:
said first gray level value is 255 and indicative of a darkened or black area;
and second gray level value is 0 and indicative of an undarkened or white area.

4. A method in accordance with claim 1 wherein:
said gray level values are represented by digital signals;
and said first and second thresholded gray level values are represented by binary signals.

5. A method in accordance with claim 1 further comprising:
utilizing said first and second thresholded gray level values of said pixels of said array to develop a reproduction of the original.

6. A method in accordance with claim 5 wherein:
said step of utilizing includes darkening a pixel of the reproduction for each first gray level value and leaving blank a pixel of the reproduction for each second gray level value.

7. A method in accordance with claim 6 wherein:
said darkening and leaving blank are carried out by a printer.

8. A method in accordance with claim 1 further comprising:
scanning said original pixel by pixel to develop said gray level values for said array of pixels.

9. A method in accordance with claim 1 wherein:
the edge error $e_1$ for each determined pair of pixels is given by the expression $$e_1 = 1 - \frac{G_{TH} - G_{B1}}{G_{A1} - G_{B1}}$$

where
$G_{TH}$ = the threshold gray level value;
$G_{A1}$ = the gray level value of the pixel of the pair whose thresholded gray level value is said first gray level value; and
$G_{B1}$ = the gray level value whose thresholded gray level value is the second gray level value.

10. A method in accordance with claim 1 wherein:
said scaning window is of dimension in said first direction equal to the screen period in said first direction.

11. A method in accordance with claim 10 wherein:
the screen direction is at 45° to said first direction;
and said window is of extent in said first direction equal to $\sqrt{2} \, P_{SCR}$.

12. A method in accordance with claim 12 wherein:
the scanning window at each position defines a sub-array of pixels which encompass the equivalent of approximately two halftone dots.

13. A method in accordance with claim 1, wherein:
said pixels have a second spatial frequency $f_{SCA1}$ in said second direction and a corresponding second period $P_{SCA2}$;

and subsequent to said processing said method further comprises:

determining from said set of thresholded gray level values further adjacent pairs of pixels of the array in the second direction whose thresholded gray level values are different, each further adjacent pair of pixels bordering a corresponding halftone dot;

for each determined further adjacent pair of pixels, determining from the gray level values of the pixels an edge error $e_2$ equal to $d_2/P_{SCA2}$, where $d_2$ is the approximate distance along the second direction between the center of the pixel of the pair whose thresholded value is equal to said first gray level value and the closest edge of the corresponding halftone dot;

and processing said set of thresholded gray level values of said pixels of said array including: (a) using a processing window to define successive sub-arrays of said pixels and for each sub-array of pixels: (i) adding the edge errors $e_2$ for the determined further adjacent pairs of pixels included in the sub-array to form a sum $S_2$; and (ii) for the pixels having thresholded second gray level values and being in the determined further adjacent pairs of pixels, starting with the pixel of the further adjacent pairs of pixels having the highest edge error and continuing with further pixels of the further adjacent pairs of pixels in the order of descending edge error, changing the thresholded gray level values of the pixels from said second to said first thresholded gray level value until the thresholded gray level values of N pixels have been changed, where N is the closest integer to the sum $S_2$.

14. A method in accordance with claim 13 further comprising:
utilizing said first and second thresholded gray level values of said pixels of said array to develop a reproduction of the original.

15. A method in accordance with claim 14 wherein:
said step of utilizing includes darkening a pixel of the reproduction for each first gray level value and leaving blank a pixel of the reproduction for each second gray level.

16. A method in accordance with claim 13 wherein:
the edge error $e_2$ is given by the expression $$e_2 = 1 - \frac{G_{TH} - G_{B2}}{G_{A2} - G_{B2}}$$

where
$G_{TH}$=the threshold gray level value;
$G_{A2}$=the gray level value of the pixel of the further pair whose thresholded gray level value is said first gray level value; and
$G_{B2}$=the gray level value of the pixel of the further pair whose thresholded gray level value is the second gray level value.

17. A method in accordance with claim 13 wherein:
said scanning window is of dimension in said first and second directions equal to the screen period in said first and second directions, respectively.

18. A method in accordance with claim 17 wherein:
the screen direction is at 45° to said first and second directions;
and said window is of extent in each of said first and second directions equal to $\sqrt{2}\, P_{SCR}$.

19. A method in accordance with claim 17 wherein:
the scanning window at each position defines a sub-array of pixels which encompass the equivalent of approximately two halftone dots.

20. A system for use in reproducing a halftone original having extent along first and second directions, the original being formed from halftone dots situated along a screen direction and having a spatial frequency $f_{SCR}$ and period $P_{SCR}$ in the screen direction comprising:
means for providing gray level values for an array of pixels extending over the original, the pixels having a first spatial frequency $f_{SCA1}$ in said first direction and a corresponding first period $P_{SCA1}$ in said first direction;
means developing a first gray level value for each pixel of the array whose gray level value equals or exceeds a threshold gray level value and developing a second gray level value for each pixel of the array whose gray level value is less than the threshold gray level value, said first and second gray level values defining a set of thresholded gray level values for said pixels;
means for determining from said set of thresholded gray level values adjacent pairs of pixels of the array in the first direction whose thresholded gray level values are different, each adjacent pair of pixels bordering a corresponding halftone dot;
means for determining for each determined adjacent pair of pixels from the gray level values of the pixels an edge error $e_1$ equal to $d_1/P_{SCA1}$, where $d_1$ is the approximate distance along the first direction between the center of the pixel of the pair whose thresholded value is equal to said first gray level value and the closest edge of the corresponding halftone dot;
and means for processing said thresholded gray level values of said pixels of said array including: (a) using a processing window to define successive sub-arrays of said pixels and for each sub-array of pixels: (i) adding the edge errors $e_1$ for the determined adjacent pairs of pixels included in the sub-array to form a sum $S_1$; and (ii) for the pixels having thresholded second gray level values and being in the determined adjacent pairs of pixels, starting with the pixel of the adjacent pair of pixels having the highest edge error and continuing with further pixels of the adjacent pairs of pixels in the order of descending edge error, changing the thresholded gray level values of the pixels from said second to said first threshold gray level value until the thresholded gray level values of M pixels have been changed, where M is the closest integer to the sum $S_1$.

21. A system in accordance with claim 20 wherein:
said threshold gray level value is 128;
said first gray level value is equal to greater than 128; and
said second gray level value is less than 128.

22. A system in accordance with claim 21 wherein:
said first gray level value is 255 and indicative of a darkened or black area;
and second gray level value is 0 and indicative of an undarkened or white area.

23. A system in accordance with claim 20 wherein:
said gray level values are represented by digital signals;
and said first and second thresholded gray level values are represented by binary signals.

24. A system in accordance with claim 21 further comprising:
means for utilizing said first and second thresholded gray level values of said pixels of said array to develop a reproduction of the original.

25. A system in accordance with claim 24 wherein:
said means for utilizing darkens a pixel of the reproduction for each first gray level value and leaves blank a pixel of the reproduction for each second gray level value.

26. A system in accordance with claim 25 wherein:
said means for utilizing comprises a printer.

27. A system in accordance with claim 20 further comprising:
means for scanning said original pixel by pixel to develop said gray level values for said array of pixels.

28. A system in accordance with claim 20 wherein:
the edge error $e_1$ for each determined pair of pixels is given by the expression $$e_1 = 1 - \frac{G_{TH} - G_{B1}}{G_{A1} - G_{B1}}$$

where
$G_{TH}$=the threshold gray level value;
$G_{A1}$=the gray level value of the pixel of the pair whose thresholded gray level value is said first gray level value; and
$G_{B1}$=the gray level value of the pixel of the pair whose thresholded gray level value is the second gray level value.

29. A system in accordance with claim 20 wherein:
said scaning window is of dimension in said first direction equal to the screen period in said first direction.

30. A system in accordance with claim 29 wherein:
the screen direction is at 45° to said first direction;
and said window is of extent in said first direction equal to $\sqrt{2}\, P_{SCRI}$.

31. A system in accordance with claim 29 wherein:
the scanning window at each position defines a sub-array of pixels which encompass the equivalent of approximately two halftone dots.

32. A system in accordance with claim 20, wherein:

said pixels have a second spatial frequency $f_{SCA1}$ in said second direction and a corresponding second period $P_{SCA2}$;

and said system further comprises:

further means for determining, subsequent to said processing by said processing means, from said set of thresholded gray level values further adjacent pairs of pixels of the array in the second direction whose thresholded gray level values are different, each further adjacent pair of pixels bordering a corresponding halftone dot;

further means for determining, for each determined further adjacent pair of pixels, from the gray level values of the pixels an edge error $e_2$ equal to $d_2/P_{SCA2}$, where $d_2$ is the approximate distance along the second direction between the center of the pixel of the further pair whose thresholded value is equal to said first gray level value and the closest edge of the corresponding halftone dot;

and further means for further processing said set of thresholded gray level values of said pixels of said array including: (a) using a processing window to define successive sub-arrays of said pixels and for each sub-array of pixels: (i) adding the edge errors $e_2$ for the determined further adjacent pairs of pixels included in the sub-array to form a sum $S_2$; and (ii) for the pixels having thresholded second gray level values and being in the determined further adjacent pairs of pixels, starting with the pixel of the further adjacent pairs of pixels having the highest edge error and continuing with further pixels of the further adjacent pairs of pixels in the order of descending edge error, changing the thresholded gray level values of the pixels from said second to said first thresholded gray level value until the thresholded gray level values of N pixels have been changed, where N is the closest integer to the sum $S_2$.

33. A system in accordance with claim 32 further comprising:

means for utilizing said first and second thresholded gray level values of said pixels of said array to develop a reproduction of the original.

34. A system in accordance with claim 33 wherein said utilizing means darkens a pixel of the reproduction for each first gray level value and leaves blank a pixel of the reproduction for each second gray level.

35. A system in accordance with claim 32 wherein the edge error $e_2$ is given by the expression $$e_2 = 1 - \frac{G_{TH} - G_{B2}}{G_{A2} - G_{B2}}$$

$G_{TH}$ = the threshold gray level value;

$G_{A2}$ = the gray level value of the pixel of the further pair whose thresholded gray level value is said first gray level value; and $G_{B2}$ = the gray level value of the pixel of the further pair whose thresholded gray level value is the second gray level value, 36. A system in accordance with claim 20 wherein:

said scanning window is of dimension in said first and second directions equal to the screen period in said first and second directions, respectively.

37. A system in accordance with claim 36 wherein:

the screen direction is at 45° to said first and second directions;

and said window is of extent in each of said first and second directions equal to $\sqrt{2}\, P_{SCR}$.

38. A system in accordance with claim 36 wherein:

the scanning window at each position defines a sub-array of pixels which encompass the equivalent of approximately two halftone dots.

* * * * *

UNITED STATES PATENT AND TRADEMARK OFFICE
CERTIFICATE OF CORRECTION

PATENT NO. : 4,926,267

DATED : May 15, 1990

INVENTOR(S) : Joseph S. Shu, et al.

It is certified that error appears in the above-identified patent and that said Letters Patent is hereby corrected as shown below:

Col. 3, line 20, Change "calculated" to -- calculating --
Col. 6, line 4, Delete "of" first occurrence
Col. 7, line 3, Before "determining" insert -- for each determined adjacent pair of pixels, --
Col. 8, line 4, after "value" insert -- of the pixel of the pair --
Col. 8, line 14, Change "with claim 12 to -- with claim 1 --
Col. 9, line 36, Change "means developing" to -- means for developing --

Signed and Sealed this

Twenty-seventh Day of August, 1991

Attest:

HARRY F. MANBECK, JR.

Attesting Officer     Commissioner of Patents and Trademarks